April 16, 1968  G. M. NAUL ETAL  3,378,043
LAMINATED SHUTTLE BLANK
Filed June 8, 1966

INVENTORS
George M. Naul
and Alfred W. Roberts
BY
ATTORNEY

United States Patent Office 3,378,043
Patented Apr. 16, 1968

3,378,043
LAMINATED SHUTTLE BLANK
George M. Naul and Alfred W. Roberts, Hampton, S.C., assignors to Westinghouse Electric Corporation, Pittsburgh, Pa., a corporation of Pennsylvania
Filed June 8, 1966, Ser. No. 556,205
5 Claims. (Cl. 139—196)

ABSTRACT OF THE DISCLOSURE

An all laminated shuttle blank is made from stacks of single size side wall sheets and single size end wall sheets wherein the tapered interior surfaces of the bobbin chamber are parallel to the exterior tapered side wall surfaces. When the bobbin chamber is tapered and terminally curved or rounded, the tapered side walls are similarly curved or rounded. In all cases the end wall sheets run in substantially the same direction as the side wall sheets and the chamber geometry can easily be changed without changing the end wall sheet dimensions.

---

This invention relates generally to shuttles for fabric weaving looms. More particularly, the invention relates to shuttle blanks prepared exclusively from stacks of resin impregnated fibrous sheet materials.

Molded plastic shuttles with a centrally disposed bobbin chamber have been prepared by molding together laminated fabric side walls and macerated fabric end walls, both the side and end wall fabrics being impregnated with a resinous binder. The resinous binder is converted to an infusible solid during molding and binds the walls together into a unitary structure with a central open chamber. During the molding cycle, movement of the randomly oriented small pieces of macerated fabric reinforcement in the end walls permits undesirable relative movement in the stack of fabric sheets for the side wall. The relative movement may cause crimping in the side wall sheets of the blank, resulting in weak points in the molded shuttle, a source of premature failure during use in the textile loom. Moreover, the bond between the macerated end walls and the laminated side walls is the weakest in the structure. Failures in service occur most frequently at this weakest bond.

It has become apparent that an improvement in the bond between side walls and end walls could be obtained if the end walls were formed from a stack of fabric sheets similar to the stacks employed for the side wall. A stacked sheet end wall would also eliminate or reduce the relative movement and crimping in the side wall stacks that occur in molding blanks with macerated end walls. Because both the side walls and the internal bobbin chamber are tapered, difficulties are encountered in the design and manufacture of shuttle blanks with all laminated side and end walls. A number of all laminated shuttle blank designs and methods for manufacturing them have been proposed. A stack of rectangular sheets of a single size for the end walls of the shuttle blank, however, could not be suitably employed in those designs.

Difficulties are encountered in manufacturing the blanks because only a very limited amount of material movement is permissible between the shaped molding mandrel and the heated mold walls that are employed to compress or consolidate the stacked sheets and cure the resinous binder to convert the stacks into a shaped unitary structure. Heretofore, satisfactory material orientation, free of gaps in the laminated structure, could only be attained by stacking the end wall sheets in a particular step-wise fashion (see application S.N. 461,931, filed June 7, 1965, assigned to the assignee of this invention) that required sheets to be cut to different sizes. Cutting sheets to different sizes is, of course, time consuming and expensive.

Accordingly, it is an object of this invention to provide an all laminated shuttle blank with an improved bond between the side and end walls.

Another object of this invention is to provide an all laminated shuttle blank employing a stack of single sized sheets for the end wall structure.

Other objects of this invention will, in part, be obvious and will, in part, appear hereinafter.

Briefly, the present invention accomplishes the above cited objects by providing a shuttle blank design in which the tapered interior surfaces of the bobbin chamber are parallel to the exterior tapered side wall surfaces. If the bobbin chamber is tapered and terminally curved or rounded, the tapered side walls are similarly curved or rounded. If the bobbin chamber terminus has some other shape, the terminus of the side wall must conform to that other shape.

For a better understanding of the invention, reference may be had to the accompanying drawing, in which.

The textile shuttle blanks of this invention are prepared by molding together a plurality of resin impregnated stacked fabric or fibrous sheets. The sheets are preferably cotton fabric sheets but may be fibrous or fabric sheets of polypropylene, polyamide, polyethylene terephthalate, combinations thereof or other synthetic or natural fiber fabrics. The sheets are coated and impregnated with suitable thermosetting resinous binders that will bind the sheets together, upon curing of the resin to the solid infusible state, and provide the hardness and durability necessary for the continuous and prolonged stress, strain and impact that is imposed on finished textile shuttles. Suitable thermosetting binder resins for shuttles include, for example, phenol-formaldehyde, melamine-formaldehyde, phenol-aniline-formaldehyde, epoxy and thermosetting alkyd or polyester resins, as well as blends and modifications of such resins.

Cresylic acid modified phenol-formaldehyde resins are particularly suitable for high strength, high impact applications and are the preferred resins for shuttle blanks. The resin employed in the examples hereinbelow was prepared by refluxing a mixture comprising, by weight, of 130 parts of cresylic acid, 14.5 parts of phenol, 108 parts of formaldehyde (37%), 1.4 parts of ammonium hydroxide (28%) and 0.3 part of ethylene diamine. The mixture was refluxed for thirty minutes at atmospheric pressure and then dehydrated at a reduced pressure of 20 to 24 inches of Hg until a temperature of 80° C. was reached and the mixture was dry to the touch. At this point, 38 parts of methanol and 35 parts of toluol, by weight, were added to provide a liquid composition suitable for impregnating and coating the fibrous sheets.

The fabric sheet material may vary in weight from about 3 to 50 ounces per square yard. The resin ratio, a ratio of the weight of the resin or varnish impregnated fabric to the weight of the untreated or unimpregnated fabric, may vary from about 2.0 to 2.8. The impregnated fabric is heated to drive off the solvent and advance the resin to an intermediate fusible condition, known as the B-stage. The fabric, impregnatde with the B-staged resin, is cut to appropriate sized sheets, the sheets are stacked and used to form a laminated preform. The preforms are then molded to final shuttle blank form with heat and pressure to consolidate the structure and advance or cure the resins to the fully cured infusible solid state.

Figure 1:
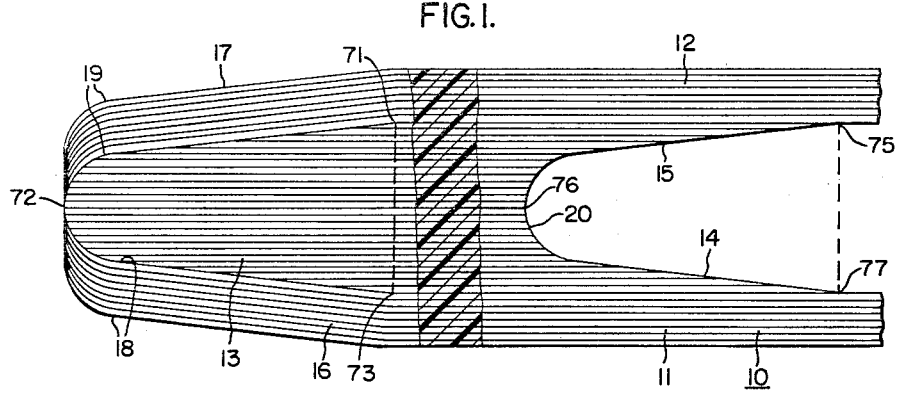
FIGURE 1 is a cross-sectional view of one end of a molded all laminated shuttle blank of this invention with curved or rounded chamber and side wall terminal regions.

Referring now to FIGURE 1 of the drawing, there is illustrated a shuttle blank 10 with side wall members 11, 12 each made from a stack of resin impregnated fabric sheets all cut to the same size, a size to permit the sheets to extend the entire length of the blank 10. The end wall 13 is made from a stack of resin impregnated fabric sheets, all also cut to the same size but considerably smaller in length than the side wall sheets. In order to provide shuttle blanks with proper material orientation and without gaps but made from a stack of end wall sheets of the same size, the tapered surfaces 14, 15 of the bobbin chamber must be parallel, respectively, to the tapered side walls 16, 17. Moreover, the curves or radii 18, 19 of the tapered side wall must conform to the terminally curved surface 20 forming the end of the bobbin chamber. In this figure the cross sectional area bounded by points 71, 72, 73, 71 will be described as the terminal region of the end wall. The cross sectional area bounded by points 75, 76, 77, 75 will be described as the terminal region of the shuttle blank chamber. The points 71, 73 and 75, 77 are located where the end wall and shuttle blank chamber, respectively, begin to taper. As can be seen in the drawing, with a stack of end wall sheets of the same size, the terminal regions of the end wall and shuttle blank chamber will have the same cross sectional areas.

Figure 2:
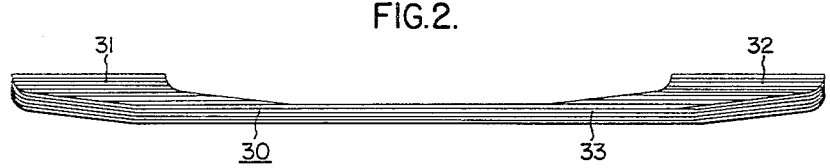
FIG. 2 is a cross-sectional view of a preform comprising side and end wall stacks, each having sheets of identical size.

If the foregoing design geometry is met, end wall sheets of the same size will consistently provide shuttle bodies with an improved bond between the end and side walls. It is not necessary, with the design geometry of this invention, to cut the side wall sheets into different sizes for the small stacks or sub-stacks described in S.N. 461,931. Referring now to FIGURE 2 of the drawing, the stacks 31, 32, suitable for making one-half of an end wall, consisting of seventeen sheets of a B-staged cresylic acid phenol-formaldehyde impregnated (to a resin ratio of 2.0) unidirectional cotton fabric having a weight of 10 ounces per square yard are placed in an alignment fixture and skewed to provide the shape of the taper and radius of one-half of the bobbin chamber. The two aligned end wall stacks and one side wall stack 33 consisting of seventeen sheets of the same fabric are set into another aligning fixture so that the aligned end walls and the side wall are properly located and combined.

The combination of side and end wall sheets is transferred to an R.F. generator and preheated for sixty seconds to a temperature of above 100° C. This heated build-up is then pressed at about 1000 p.s.i. in a cold preform mold, to consolidate the assembly into the desired curvature of the end wall sheets and the desired conforming radius of the side wall terminus. The consolidated (but not fully cured) preform approximates the desired final form of the shuttle blank. The end wall stacks 31, 32 form one-half of the ultimate end wall and the side wall stack 33 extends the length of the blank to form the preform 30 shown in FIGURE 2.

Two of the described preforms are then heated in a R.F. generator for approximately 60 seconds. A first preform is placed into the lower half of an appropriately shaped mold. A mandrel is placed over the preform to shape the bobbin chamber. A second preform is placed over the first preform and the upper mold half is positioned over the preforms. The required shuttle geometry is, of course, reflected in both the mold wall and mandrel. The mold is at a temperature of about 165° C. The inserted preform combination is baked for 25 minutes at a pressure of about 2500 p.s.i. to further consolidate the forms and cure the resin to its infusible solid state. The form is cooled for 15 minutes while the pressure is maintained. The mold is then opened and the molded shuttle blank form is removed.

It should be understood that the shuttle blanks may be individually molded or they may be cut from a longer molded tubular member having the desired cross-section. It should also be understood that two side and one end wall stacks may be first preformed together into the combination described above or they may be made into individual preforms which are inserted into the mold. It is also possible to insert the stacks, without preforming, directly into the mold. What ever particular procedure is employed, it is essential that the described geometry be employed in the shuttle blank design and that the geometry be reflected in the design of the mold and mandrel.

Figure 3:
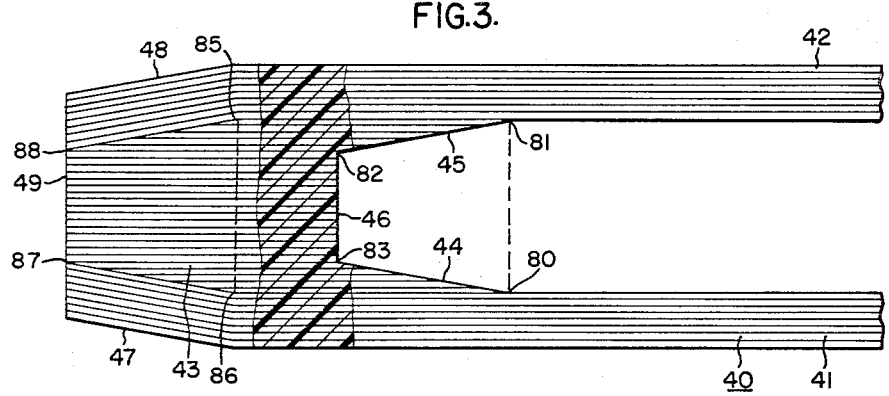
FIG. 3 is a cross-sectional view of one end of an all laminated shuttle blank, in accordance with the invention, having angular or trapezoidal terminal regions.

If the bobbin chamber cross-section is to have a terminus or terminal region that is rectilinear instead of the heretofore described curvilinear terminus, the end walls may nonetheless be made from stacks of equal sized sheets, in accordance with this invention. The geometry of the side wall must, however, conform to the geometry of the end wall and appropriate chamber surfaces. Referring now to FIGURE 3, there is illustrated a portion of a shuttle blank 40 having a square angular bobbin chamber end that may also be described as trapezoidal in shape. The side wall members 41, 42 are each made from a stack of resin impregnated cotton fabric sheets all cut to the same length, sufficiently long to extend the entire length of the blank. The end wall 43 is a stack of smaller but also identically sized sheets. The end wall stack has been aligned in a fixture so that it forms the tapered surfaces 44, 45 and the surface 46 which is perpendicular to the longitudinal axis of the blank. In accordance with the principles of this invention, the surfaces 44, 45, 46 of the chamber outline must conform to, i.e. be parallel to the surfaces 47, 48, 49, respectively. The two trapezoidal shapes, i.e. the chamber and the blank walls, should have identical included angles. In this figure the cross sectional area bounded by points 85, 86, 87, 88, 85 will be described as the terminal region of the end wall. The cross sectional area bounded by points 80, 81, 82, 83, 80 will be described as the terminal region of the shuttle blank chamber. The points 85, 86 and 80, 81 are located where the end wall and shuttle blank chamber, respectively, begin to taper. The distance between points 88 and 85 is the same as the distance between points 81 and 82. The distance between points 88 and 82 is the same as the distance between points 85 and 81. As can be seen in the drawing, with a stack of end wall sheets of the same size, the terminal regions of the end wall and shuttle blank chamber will have the same cross sectional areas.

Figure 4:
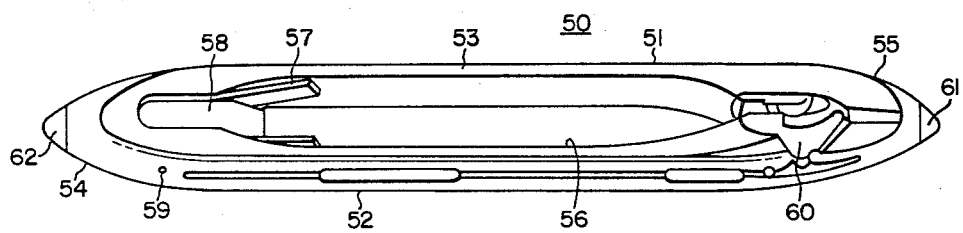
FIG. 4 is a perspective view of a finished shuttle including hardware mounted thereon.

The shuttle blanks are further machined to form a finished shuttle body. Referring now to FIGURE 4, there is illustrated a finished shuttle 50 comprising a shuttle body 51 with appropriate hardware. The side members 52, 53 have tapered end portions 54, 55 and an interior bobbin chamber 56. The hardware comprises a spring clip 57 for holding a bobbin (not shown) in position, seated in a suitable aperture and held in place by a cover 58 and bolt 59; a threading block or eye 60 and spurs 61, 62.

While there have been shown and described what are at present considered to be the preferred embodiments of the invention, modifications thereto will readily occur to those skilled in the art. It is intended, therefore, that the matter contained in the foregoing description or shown in the accompanying drawing, be interpreted as illustrative and not in a limiting sense.

We claim:

1. A molded shuttle blank having an elongated body, the elongated body having spaced tapered side walls and end walls defining a centrally located elongated and tapered chamber, the spaced side walls consisting of laminated stacks of resin impregnated fibrous sheets all having substantially the same dimensions and extending the full length of the blank and having surfaces tapering inwardly at the ends, the end walls consisting of laminated stacks of resin impregnated fibrous sheets running in substantially the same direction as the side wall sheets, said end wall sheets having substantially the same dimensions and shorter than the sheets for the side walls, each end wall sack skewed to form inwardly tapering chamber surfaces, the inwardly tapering surfaces of the chamber being parallel to the inwardly tapering surfaces of the side walls, and conforming to the same design geometry as the tapering inner side walls surfaces, the resin impregnated sheets having been consolidated under heat and pressure into a thermoset shuttle blank.

2. The molded shuttle blank of claim 1 in which the inwardly tapering surfaces of the chamber have a shaped terminus and the inwardly tapering side walls have a shaped terminus parallel to the shaped terminus of the chamber.

3. A molded shuttle blank of claim 1 in which the inwardly tapering surfaces of the chamber have a curved terminus of a first radius, the side walls having a curved terminus of a radius substantially equal to the first radius.

4. The molded shuttle blank of claim 1 in which the inwardly tapering surfaces of the chamber have a lineal terminus and form a trapezoid therewith, the inwardly tapering side walls have a lineal terminus and form a trapezoid therewith, the two trapezoids having identical included angles.

5. A molded shuttle blank, prior to any machining, having an elongated body, the elongated body having spaced tapered side walls and end walls defining a centrally located elongated and terminally tapered chamber, the spaced side walls consisting of laminated stacks of resin impregnated fibrous sheets all having substantially the same dimensions and extending the full length of the blank and having surfaces tapering inwardly at the ends, the two end walls each consisting of a laminated stack of flat parallely disposed resin impregnated fibrous sheets running in substantially the same direction as the side wall sheets, each of said end wall sheets having substantially the same dimensions and being shorter than the sheets for the side walls, the sheets in each end wall stack being skewed to form inwardly tapering chamber surfaces, the other end of the skewed end wall stack abutting the tapered surface of the elongated body, the end wall terminal region having the same design geometry and cross sectional area as the terminal region of the shuttle blank chamber, the resin impregnated sheets having been consolidated under heat and pressure into a thermoset shuttle blank.

References Cited

UNITED STATES PATENTS

| 2,824,581 | 2/1958  | Heard  | 139—196 |
| 2,905,208 | 9/1959  | Goreau | 139—196 |
| 3,089,522 | 5/1963  | Phelps | 139—196 |
| 3,209,790 | 10/1965 | Naul   | 139—196 |
| 3,263,708 | 8/1966  | Phelps | 139—196 |

FOREIGN PATENTS

| 454,358   | 1/1950 | Italy.  |
| 1,010,899 | 3/1952 | France. |

MERVIN STEIN, *Primary Examiner.*

J. KEECHI, *Assistant Examiner.*